(No Model.) 3 Sheets—Sheet 1.

H. CARTER.
DITCHING AND EXCAVATING MACHINE.

No. 365,580. Patented June 28, 1887.

Witnesses
A.G. Mather
J.F. Ritchie

Henry Carter
Inventor
A. Harvey
Attorney (No Model.)
H. CARTER.
DITCHING AND EXCAVATING MACH
No. 365,580. Patented
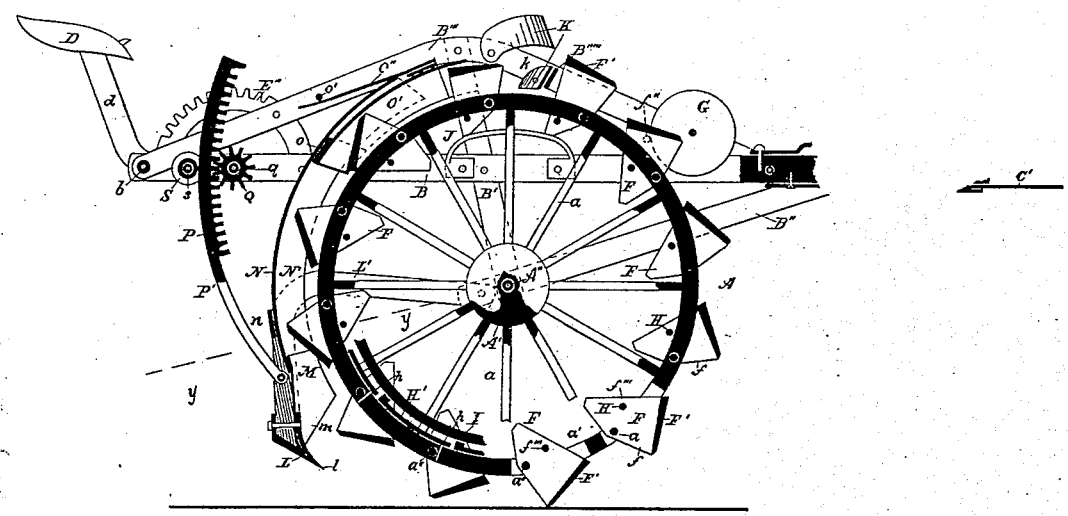
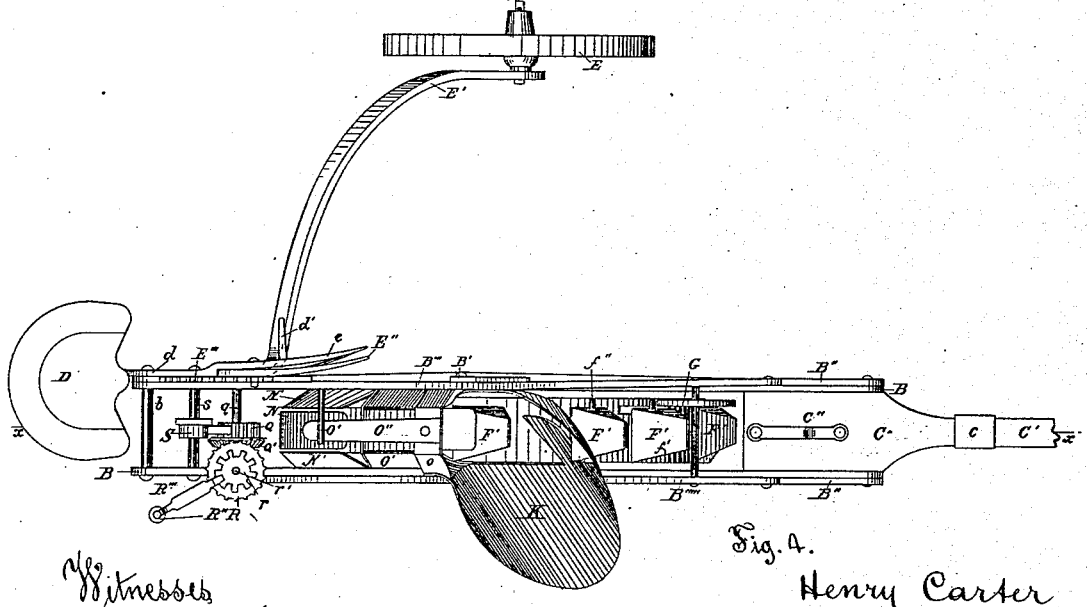
Fig. 4.
Witnesses
A. G. Mather
J. F. Ritchie
Henry Carter
Inventor
A. Harvey
Attorney (No Model.) 3 Sheets—Sheet 3.
H. CARTER.
DITCHING AND EXCAVATING MACHINE.
No. 365,580. Patented June 28, 1887.
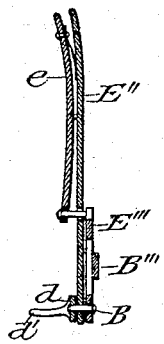
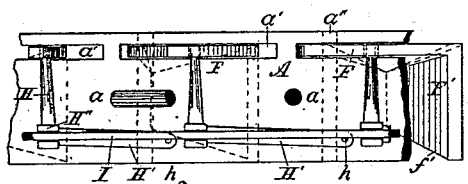
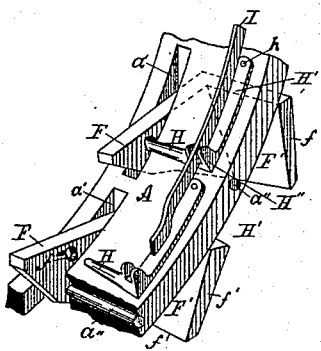
Witnesses
A. G. Mather
J. F. Ritchie
Henry Carter
Inventor
A. Harvey
Attorney

UNITED STATES PATENT OFFICE.

HENRY CARTER, OF SPRINGFIELD, ONTARIO, CANADA.

DITCHING AND EXCAVATING MACHINE.

SPECIFICATION forming part of Letters Patent No. 365,580, dated June 28, 1887.

Application filed July 8, 1886. Serial No. 207,492. (No model.)

*To all whom it may concern:*

Be it known that I, HENRY CARTER, of Springfield, in the Province of Ontario, Dominion of Canada, have invented new and useful Improvements in Ditching and Excavating Machines, of which the following is a specification, reference being had to the drawings hereto annexed and forming part hereof.

My invention relates to machines for cutting and clearing or excavating ditches or trenches, and more particularly to that class of ditchers which operate by means of a plow or share and have a large elevating-wheel fitted with scoops to lift and discharge the soil.

Figure 1:
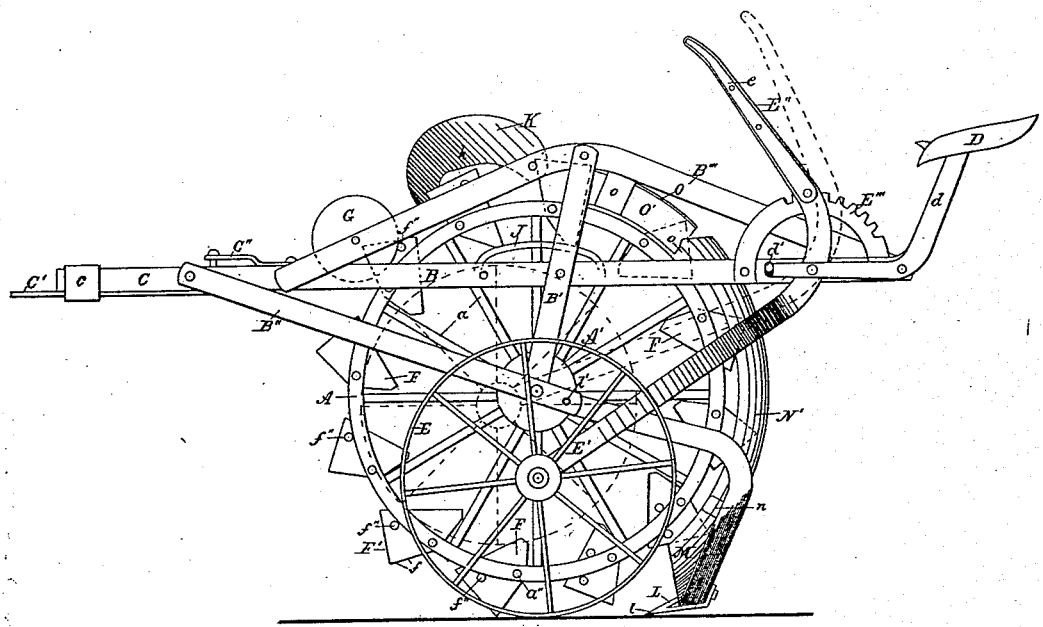
Figure 2:
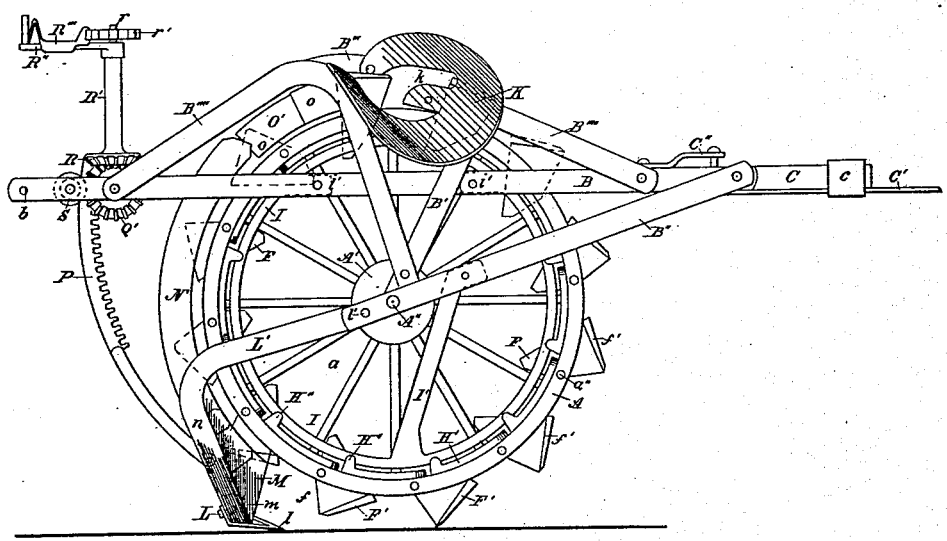

Figure 1 is a side elevation of my improved machine, showing the side wheel in front, the dotted lines showing the latter raised. Fig. 2 is a similar elevation of the other side. Fig. 3 is a longitudinal section on line $x$ $x$ in Fig. 4. Fig. 4 is a top view. Fig. 5 is a view of a portion of the interior of the rim of main wheel. Fig. 6 is a detail view of the land-side lever. Fig. 7 is a detail view of one of the scoops and the locking device.

The machine has the following main features: A large broad-rimmed elevating-wheel is journaled in a light frame constructed mainly of straight bars strongly braced together. The rim of the elevating-wheel carries a series of scoops, which may be briefly described as angle-plates or gussets, the triangular flanks of which pass through and are pivoted in longitudinal slots near one edge of the rim, projecting inside and leaving a transverse portion or wing turned at a right angle to project outside. When swiveled into its working position, the said wing heels with one edge on the rim, so as to form an acute-angled mouth therewith, which is open on one side, the mouth facing the direction of its movement. They are placed in this position by passing under a disk-wheel mounted near the top of the frame, which engages a short pin at the outside of the longitudinal scoop-shank and presses the same close against the rim of the elevating-wheel. A bolt forming part of a latch pivoted to the internal face of the rim and actuated by a stationary rim-cam secured to the framing enters an eye provided in the internal portion of the scoop-shank and locks it in position. When the scoop has been partly raised toward the top, the rim-cam withdraws the latch-bolt, so as to leave it free to be swiveled before passing the discharging-chute, when the internal scoop-point bears against a cam, which turns the same in a position that the transverse portion is approximately parallel to the rim, in which position it passes through a slot in the discharge-spout, which acts as scraper or clearer. These scoops, it will be seen, act like elevator-buckets, entering and cutting into the ground as the wheel rolls along and drawing the soil which is being cut or loosened by the plowshare or spade up through a throat at the rear. This throat is a trough extending from the plow-point or share to the discharge-spout, bent to the curvature of the elevator-wheel and consisting of two telescoping sections—the short upper stationary one, which is yieldingly secured at the upper end or mouth of the discharge-spout, and the longer lower one, yieldingly secured to the cutting-mouth and plowshare and carried by a pair of bent arms pivoted near the elevating-wheel center and by a rack gearing into a spur-wheel actuated by miter-gear and a spring-latched crank on an upright spindle brought within reach from the driver's seat.

In cross-section the trough is conical, and each section consists of three flexible strips composing the sloping sides and the flat bottom, these strips being bound together by hoops or bands, one near the lower end of the lower adjustable section and one at each end of the upper stationary section; and the interior of the throat is made an easy fit to the scoops, the flexible strips composing the throat adapting themselves to any moderate inequalities of the charges. The plow-point cuts the bottom of the trench, the cutting-mouth of the throat immediately above the plow cuts the sides, and the buckets or scoops elevate the soil and discharge the same sidewise through the chute. The elevating-wheel and frame are steadied by a land or side wheel carried by a curved arm terminating in a lever-handle provided with a spring-latch engaging notches in a segment, the arm being pivoted to the frame within reach from the driver's seat. By adjustment—*i. e.*, raising or lowering the side wheel by means of the lever—the machine may be adjusted to sloping ground and to the depth of the ditch. At the front, forming part of the frame, is secured a block, to which a flexible steel tongue is secured.

A is the rim of the elevating-wheel, A' the hub, and a the spokes. The frame is composed of a long straight and approximately horizontal bar, B, on each side, and as regards height between the hub and the top of the wheel, being secured in front of the tongue-block C, and at the rear connected by a stay or distance piece b. To the bar B straight upright, though slanting, bars B' are secured, one on each side, occupying different positions. The lower ends of these carry the axle A'' of the main wheel. Each of these uprights is braced by a bar, B'', connecting the forward end of the main bars B and the lower end of the upright B', the axle A'' passing through both B' B'', and the latter are made somewhat longer to form heels, to which the trough-arms are pivoted. An upper curved bar, B''', is secured at the land-wheel side, while on the spout side is secured the curved bar B'''' and at the rear, and the straight bar B''''' at the front, to provide facilities for attachment at various parts.

D is the driver's seat attached to a short curved bar, d, turned to form a foot-rest, d', and fastened at the rear end on the land-wheel side to the frame B.

C' is the flexible steel tongue secured by screws or bolts and a rim or hoop, c, to the block C. C'' is the doubletree-iron.

E is the land-side wheel journaled to the lower end of the adjustable curved lever-arm E', Figs. 1, 4. The arm E' is pivoted near the rear between the frame-bar B and seat-bracket and foot-rest d d', and is then continued upward, bent in the direction of its width to form the lever-handle E'' in one piece, to which is hinged a spring-latch lever, e, provided with a pin passing through the lever E'', and adapted to engage a series of notches in a segment, E''', secured to the frame-bars B and B'''. By adjusting the lever E'' forward or backward the side wheel is lowered or raised.

The scoops or buckets consist each of an approximately-parallel piece of plate having one corner beveled off and the broad end bent at a right angle, or nearly so, in the manner of a gusset-bracket. The beveled portion F is inserted in a longitudinal slot, a', near one edge of the rim A, and pivoted therein at its heel or beveled edge (which faces the rear) by a pin, a'', passing transversely through the rim, and projects in the interior of the wheel, the portion F' (together with a part of the shank F) projecting outwardly and reaching transversely across the rim. This transverse portion F' is the working part proper, acting like a shovel or scraper as lifter of the soil, having (together with the outward-projecting part of the shank F) the edges f, facing the rear of the machine, sharpened to form cutting-edges, and its side edge, f', beveled rearwardly to correspond with the conical section of the throat, the projecting part of the shank F near the bent end being also bent a little or otherwise worked to obtain a slight bevel for the same purpose. When in working position, (see the lower scoops, Figs. 1, 2, and 3,) the outward-projecting portion of the shank F appears as a triangle and the transverse scraper F' heels with its forward edge against the rim and forms an acute angle therewith. It is forced into this position by a loose disk-wheel, G, so journaled in the bars B''' and B'''' as to allow the passage between it and the rim A of the short pin f'', secured outside in the outer and forward portion of the shank F, which pin f'' the roller G strikes and forces the same close to the rim. While the scoop is thus held it is locked in that position by a bolt, H, entering the eye f''', formed in the shank F. The bolt H forms part of a latch, H', pivoted at its tail end by a pin, h, to the internal face of the rim A, and is provided with a slotted or forked lug, H'', forming a guide running upon the stationary rim-cam I, secured to the frame at i and i', and by an arm, I', below. This rim-cam has two inclines, one pushing the guide H' inward and forcing the bolt H in the eye f''' and the other pulling the same back and withdrawing the bolt from the eye before the scoop has arrived at the top to be discharged.

J is a cam secured inside to the frame-bar B, and is so adapted and situated that the tip of the shank F is bound to come in contact with it and be retarded and the scoop turned up so that the transverse part F' assumes an approximately parallel position to the rim A. (See the uppermost scoops, Figs. 1, 2, and 3.) In this position it passes the chute, the tip of the shank F continuing to bear on the cam until the scoop nears the roller G, when the tip F loses its bearing upon the cam. K is the chute or spout for discharging the raised soil laterally, and consists of a suitably bent, shaped, molded, and inclined plate or sheet secured at the top of the frame and at the end and in continuation of the trough or throat. A slit, k, corresponding to the longitudinal section of the scoop, is formed in that part of the chute reaching across the wheel-rim, through which slot the scoops pass, the chute thus also acting as scraper and clearer for the scoops and wheel-rim.

L is the plowshare or plow-point for cutting the bottom of the trench or ditch. It consists of a plate doubled up in the form of a shoe, as shown in Fig. 3, and formed with a cutting-edge, l. This shoe is held by a pair of curved arms, L', pivoted to the frame-bars B'' at l', near the center of the main wheel. The upper inner end is riveted to the bottom of a short solid section, M, of the throat, having an enlarged mouth, which is provided with cutting-edges, m. N and N' are respectively the back and sloping sides of the trough or throat, each consisting of a flexible strip bound together near its lower end by a band, n, and having the back N flexibly secured to the upper end of the section M, which it overlaps, while the upper ends overlap the upper section and are free to yield in any direction. The upper short section of the throat is secured at the entrance to the chute, its unsupported end meeting and overlapped by the free end of the lower and longer section telescopically. It consists of the back O and sloping sides O', bound together at each end by the bands o. To the upper end is fastened a spring, O'', which, when the section O O' is forced upward by the telescoping action of the lower section, abuts against a projection, o', secured to the frame bar B'''. The cutting-mouth and throat are tapering or conical in cross-section, being somewhat wider at their widest part than the rim A, and the throat is adapted to the size and shape of the scoops, so as to be a very easy and loose fit. The throat is curved, so as to be approximately concentric with the rim A. The plow-point is made adjustable for depth by means of the curved rack P, connecting the arms L' pivotally by a forked arm, P', the rack gearing into a spur-wheel, Q, which carries a bevel-wheel, Q', journaled upon a horizontal stud, q, and the bevel-wheel Q' gearing into another bevel-wheel, R, having a long tubular hub or neck, R', with a crank-handle, R'', at its upper end journaled upon an upright stud, r, which carries at the top a notched disk, r', into which the handle R'' is locked by the spring-latch R'''. The back of the rack P bears against a flanged roller, S, journaled upon a stud, s, to keep it in gear with the spur-wheel Q. The handle R'' being turned, the rack P, and with it the plow-point L and throat M N N', is raised or lowered and the depth of the cut regulated.

The machine operates as follows: The plow-point being adjusted for the desired depth of cut by means of the spring-latched crank R'', the machine is drawn forward and the side wheel adjusted by the lever E' to bring the main wheel to a perpendicular position. In its forward movement the point l cuts the bottom of the ditch and the lips m the sloping sides, the scoops F', locked by the bolts H, having penetrated into the ground, pass the plow and enter the throat, lifting the intervening soil which is held together by the latter. During their upward movement the bolts H are withdrawn by the cam I, the scoops being kept in position by their load. When each individual scoop arrives at the discharge end of the throat and at the chute K, the tip F of the scoop bears upon the cam J, which raises the scoop so that the part F' is approximately concentric with the rim A, and in this position it is held by the cam while passing through the chute and through the slot k therein, the elevated soil being thereby cleared off the scoops and discharged laterally downward the chute. The scoop-tip F now leaves the cam J, and while free to swivel it is turned back to its working position by the disk-wheel G, between the edge of which and the rim A the pin f''' is compelled to pass in close contact. While thus held the guide H'' passes over an incline in the rim cam I, and the latch H' is turned and the bolt H forced into the eye f'''', locking the scoop in its position ready for action again. The flexible tongue allows for moderate oscillations due to unevenness of the ground or soil.

I claim as my invention—

1. The combination of the frame B, B', B'', B''', B'''', and B''''', tongue-block C, flexible tongue C', stay b, bracket d d', side wheel, E, arm and lever E E' e, segment E''', main wheel A A' a, slots a', pins a'', scoops F F' f'', latch-bolts H H' H'', cam I, cam J, chute K, slot k, disk G, arms L', plow-point L, mouth-piece M, throat N N' n and O O' o, spring O'', stop o', rack P P', wheels Q Q', stud q, wheel R, hub R', handle R'', stud r, disk r', latch R''', roller S, and stud s.

2. The combination of the frame-work B B' B'' B''' B'''' B''''', tongue-block C, tongue C', stay b, cam J, main wheel A A' a, scoops F F' f'', side wheel, E, adjustable arm E' E'', arms L', carrying throat-section O O', chute K, and disk G.

3. The combination of the frame-work, consisting of flat bars suitably braced and connected by the tongue-block C and distance-piece b, the axle A'', hub A', spokes a, rim A, segment E''', lever-arm E' E'', and side wheel, E.

4. The combination of the cam J, frame-bar B, and scoops F F'.

5. The combination of the arms L', plow-point L, mouth-piece M, throat N N' n, rack P P', wheel Q, roller S, and stud s.

6. The combination of the plow-point L, mouth-piece M, throat-section N N' n and O O' o, spring O'', and stop o'.

7. The throat constructed of flexible strips N and N', bent to the curvature of the main wheel-rim, bound near their lower end by a band, n, and connected flexibly to a mouth-piece, M, having enlarged cutting-rim m.

8. The combination of the flat cutting plow-point L, arms L', pivoted near the center of the main wheel, with the cutting mouth-piece M, flexible strips N N', held together by a band, n, and connected flexibly to the upper end of said mouth-piece, and the throat-section O O', overlapped telescopically by the free end of the flexible strips N N'.

9. The combination of the frame, stud r, notch-disk r', latch R''', crank R'', neck R', bevel-wheel R, bevel-wheel Q', spur-wheel Q, stud q, stud s, roller S, rack P, arms P', arms L', point L, mouth-piece M, throat N N' n and O O' o, spring C'', and stop o'.

10. The combination, with the frame-work, of the throat-section O O', chute K, slot k, and one-armed scoops F F'.

11. The combination of the rim A, slots a', pins a'', latch-bolts H H' H'' h, stationary rim-cam I, and scoops F F', having eyes f'''.

12. The main wheel having a broad flat rim, A, carrying a series of one-armed scoops, F F' f'', pivoted in longitudinal slots and projecting internally and externally, and adapted to assume different positions therein and to be held in or locked in such position by stationary cams and suitable locking devices.

13. The combination of the main wheel A A' a, a series of scoops, F F' f'', disk-wheel G, bolts H H' H'', stationary rim-cam I, and cam J.

14. The combination of the main wheel-rim A, scoops F F', cam J, plow-point L, mouth M, throat N N' O O', and chute K.

15. In combination with the main wheel-rim A, a series of scoops consisting of a longitudinal shank, F, passing through said rim near one edge thereof and pivoted therein, and a transverse scraper-shank, F', projecting across said rim, having cutting-edge f, and adapted to be held at an acute angle to said rim.

16. The combination of a rim, A, slot a', pin a'', scoops F F', and throat-sections N N' and O O'.

17. The combination of a wheel-rim, A, chute K, slot k, and one-armed scoops F F'.

18. A pivotal scoop consisting of a piece of plate having one corner beveled off and bent at an approximately right angle to form the two shanks F and F', pivoted in the rim of the main wheel and provided with cutting-edges f, beveled sides f', pin f'', and eyes f''', all substantially as shown and described, and for the purpose set forth.

Signed at St. Thomas, Ontario, this 2d day of March, 1886.

HENRY CARTER.

Witnesses:
JAMES BROOKS,
ANDREW SUTHERLAND.